(12) United States Patent  
Houde-Walter

(10) Patent No.: US 7,454,860 B2
(45) Date of Patent: Nov. 25, 2008

(54) METHOD OF SIGHTING A FIREARM WITH A DIFFRACTIVE HEAD UP DISPLAY

(75) Inventor: William R. Houde-Walter, Rush, NY (US)

(73) Assignee: LaserMax, Inc., Rochester, NY (US)

( * ) Notice: Subject to any disclaimer, the term of this patent is extended or adjusted under 35 U.S.C. 154(b) by 0 days.

(21) Appl. No.: 11/424,982

(22) Filed: Jun. 19, 2006

(65) Prior Publication Data

US 2006/0236585 A1    Oct. 26, 2006

Related U.S. Application Data

(62) Division of application No. 10/662,213, filed on Sep. 12, 2003, now Pat. No. 7,069,685.

(51) Int. Cl.
*F41G 1/30* (2006.01)

(52) U.S. Cl. ........................................................... 42/131

(58) Field of Classification Search .................... 42/113, 42/131
See application file for complete search history.

(56) References Cited

U.S. PATENT DOCUMENTS

| 4,012,150 A |   | 3/1977  | Upatnieks |          |
|-------------|---|---------|-----------|----------|
| 4,372,639 A | * | 2/1983  | Johnson   | 359/15   |
| 4,561,204 A | * | 12/1985 | Binion    | 42/122   |
| 4,592,654 A |   | 6/1986  | Girault et al. |     |
| 4,643,515 A | * | 2/1987  | Upatnieks | 359/10   |
| 5,151,800 A | * | 9/1992  | Upatnieks | 359/14   |
| 5,483,362 A | * | 1/1996  | Tai et al. | 359/1   |
| 5,509,226 A |   | 4/1996  | Houde-Walter |      |
| 5,761,235 A |   | 6/1998  | Houde-Walter |      |
| 5,813,159 A |   | 9/1998  | Kay et al. |         |
| 5,815,936 A |   | 10/1998 | Sieczka et al. |    |
| 5,917,459 A | * | 6/1999  | Son et al. | 345/7   |
| 6,490,060 B1| * | 12/2002 | Tai et al. | 359/15  |
| 2002/0078618 A1 | * | 6/2002 | Gaber | 42/123 |
| 2003/0208753 A1 | * | 11/2003 | Corrigan et al. | 725/31 |
| 2003/0218726 A1 | * | 11/2003 | Huibers | 353/84 |
| 2003/0223043 A1 | * | 12/2003 | Yoshino | 353/10 |
| 2003/0226834 A1 | * | 12/2003 | Ishikawa et al. | 219/121.77 |
| 2006/0286482 A1 | * | 12/2006 | Sewell | 430/270.1 |

* cited by examiner

*Primary Examiner*—Stephen M Johnson
(74) *Attorney, Agent, or Firm*—Brian B. Shaw, Esq.; Dominic P. Ciminello, Esq.; Harter Secrest & Emery LLP

(57) ABSTRACT

A head up display for firearms is provided, wherein a light valve is employed to create variable images in response to user input. The images from the light valve are entrained in an illuminating beam which intersects a diffractive optic. The diffractive optic includes a recorded infinite focal plane which is reconstructed by the illuminating beam, thereby displaying the image from the light valve at an infinite focal plane which is readily viewed be a user looking through the diffractive optic.

29 Claims, 4 Drawing Sheets

METHOD OF SIGHTING A FIREARM WITH A DIFFRACTIVE HEAD UP DISPLAY

CROSS-REFERENCE TO RELATED APPLICATIONS

The present application is a division of U.S. Ser. No. 10/662,213 filed Sep. 12, 2003 now U.S. Pat. No. 7,069,685, entitled Diffractive Head Up Display for Firearms and which is expressly incorporated by reference.

STATEMENT REGARDING FEDERALLY SPONSORED RESEARCH OR DEVELOPMENT

Not Applicable.

REFERENCE TO A "SEQUENCE LISTING"

Not Applicable.

BACKGROUND OF THE INVENTION

1. Field of the Invention

The present invention relates to head up displays, and more particularly, to a head up display for firearms, wherein a plurality of images can be selectively presented to a viewer.

2. Description of Related Art

There are several types of sights used with small arms, such as rifles, shotguns, handguns, bows and other similar hand held weapons including sights which incorporate holographic images of various one, two and three dimensional reticle patterns. Prior devices incorporating holograms are shown in U.S. Pat. Nos. 5,483,362; 4,643,515; 5,151,800; 5,815,936; and 6,490,060.

However, a need exists for a head up display for firearms which can provide a variable or a variety of images in response to user input. The need also exists for a compact lightweight head up display system that can be cooperatively engaged with firearms.

BRIEF SUMMARY OF THE INVENTION

The present invention provides a head up display for firearms, wherein any of a variety of images can be selectively presented to an operator. In one configuration, a light valve is optically intermediate a beam generator and a hologram. The hologram includes a recorded image of an infinite image plane. The beam generator creates an illuminating beam that passes through the light valve and the hologram. The illuminating beam passes through the light to acquire the information in the light valve, then reconstructs the recorded infinite image plane from the hologram. The illuminating beam thus acquires any image in the light valve and upon reconstructing the image plane of the hologram, effectively displays the image of the light valve at the infinite image plan.

As the light valve can present a variety of images, or even a video, the present head up display provides a variety of images and hence data that can be presented.

BRIEF DESCRIPTION OF THE SEVERAL VIEWS OF THE DRAWING(S)

DETAILED DESCRIPTION OF THE INVENTION

Figure 1:
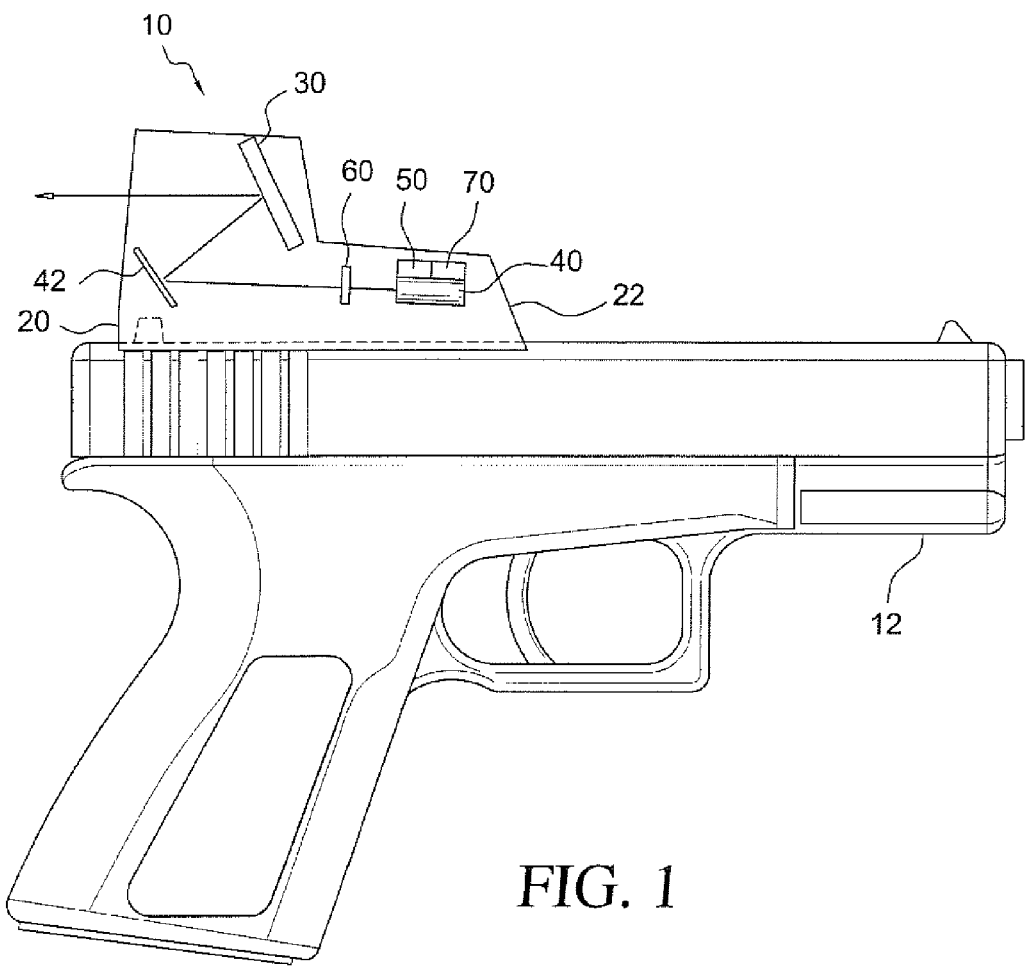
FIG. 1 is a side elevational view of a firearm incorporating the head up display.

Referring to FIG. 1, a compact head up display 10 for a firearm 12 is shown. The head up display 10 can be cooperatively mounted to any of a variety of handheld, side and small arms such as pistols, rifles, shotguns, automatic, semi-automatic arms, as well as bows, collectively referred to as firearms.

The head up display 10 includes a base 20, a diffractive optic 30 connected to the base, a laser 40, a power source 50 for powering the laser, a light valve 60 and an image generator 70 operatively connected to the light valve.

Referring to FIGS. 1-4, the base 20 can be any of a variety of configurations that cooperatively engage the firearm 12. The base can include any of a variety of clamping or mounting mechanisms such as a Weaver style, picatinny mount or dove tail engagement. It is also understood the base 20 can include a cover or shroud 22 to encase or substantially encase or house the remaining components of the head up display.

The base 20 is constructed to operatively retain the diffractive optic 30, the laser 40, the power source 50, the light valve 60 and the image generator 70 relative to the firearm 12. However, it is understood that aspects of the head up display 10 can be integrated into the firearm 12. For example, the power source 50 and/or image generator 70 can be retained or housed in the firearm 12.

Figure 2:
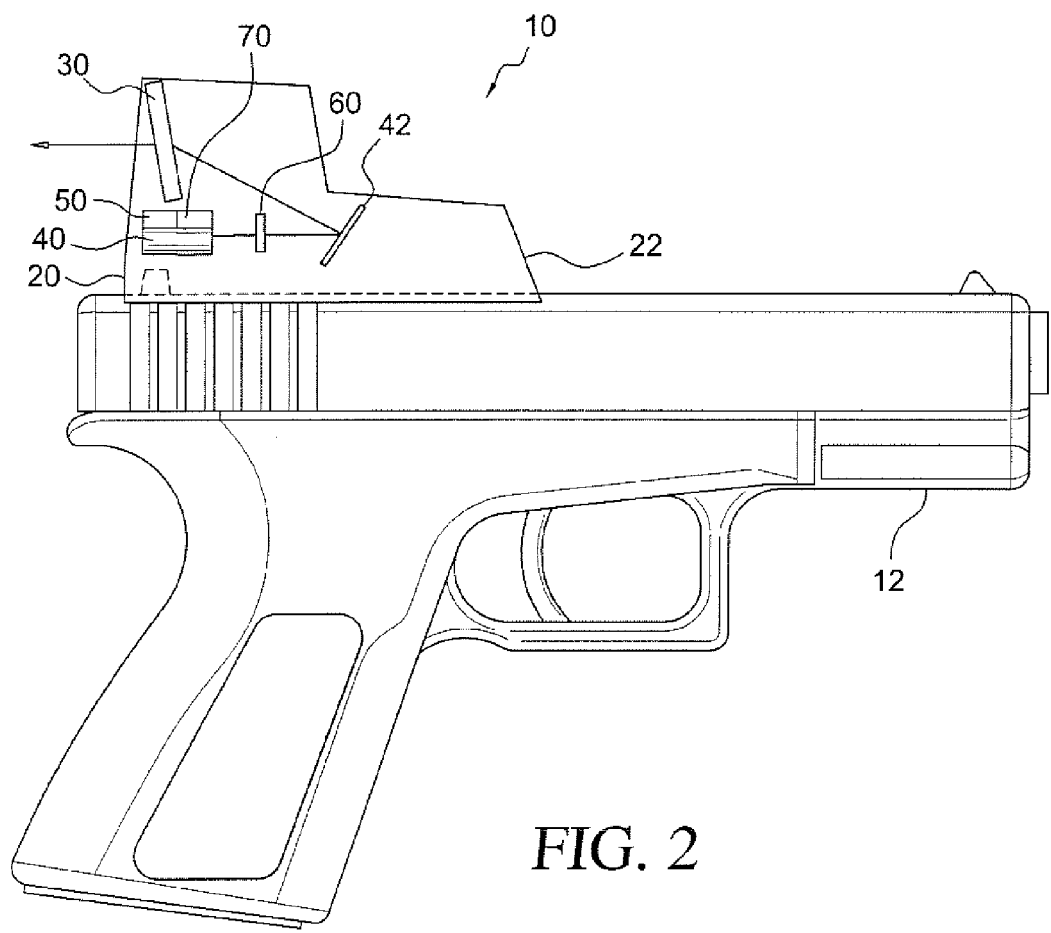
FIG. 2 is a side elevational view of a firearm incorporating a transmissive diffractive optic.

The diffractive optic 30 is connected to the base 20. Although the diffractive optic 30 is shown as fixedly connected to the base 20 it is understood the diffractive optic can be moveably connected to the base between an operable position and a closed (or transport) position. In the fixed or operable position, the diffractive optic 30 is disposed so that an operator of the firearm 12 can sight through the diffractive optic. It is understood the diffractive optic 30 can be reflective rather than transmissive as seen in FIG. 2. However, as the transmissive diffractive optic has a shorter optical path length than the reflective diffractive optic, it is preferred the diffractive optic be transmissive.

Preferably, the diffractive optic 30 has power. That is, the diffractive optic 30 is one of a focusing diffractive optic, diverging diffractive optic or collimating diffractive optic. In one configuration, the diffractive optic 30 is a hologram and is fixedly attached to the base 20. In a further configuration, the diffractive optic 30 is a transmissive hologram. A transmissive diffractive optic provides that as an illuminating beam intersects the diffractive optic, the illuminating beam is diffracted by and passes through the optic.

In either the permanent or the moveable mounting of the diffractive optic 30, it is understood the diffractive optic can be mounted to allow adjustment around one, two or three mutual perpendicular axes. Thus, an alignment of the diffractive optic 30 can be performed to accommodate variations or tolerances in components, as well as wear.

In one configuration, the diffractive optic 30 is a hologram with a recorded image of a ground glass screen. More generally, the recorded image is preferably that of an image plane at infinity. Thus, a transmissive hologram having a recorded infinite image plane is preferably employed. It is understood that images for reconstruction can be recorded in the hologram. However, as such images are permanent and cannot be changed during operation or use of the head up display 10, the hologram can be recorded to provide the image plane at infinity. However, it is understood the image plane can be located adjacent an eye of the user (intermediate the firearm and the user) or anywhere from the firearm to infinity. Thus, the image plane can be located from adjacent the user to infinity.

The laser 40 is connected to the base for projecting an illuminating beam to intersect the diffractive optic 30. The laser 40 can directly illuminate the diffractive optic 30, or alternatively include folding or redirecting optics such as mirrors 42 which define the optic path from the laser to the diffractive optic. In one configuration, the illuminating beam from the laser 40 intersects the diffractive optic 30 at an inclined angle. That is, the principal ray of the illuminating beam is inclined relative to the normal of the diffractive optic 30.

In one configuration, the laser 40 produces a diverging coherent beam. A preferred laser is a laser diode such as HL6321 MG manufactured by Hitachi.

In one configuration, the power source 50 includes at least one battery. Depending upon the anticipated power requirements, available space and weight restrictions, the batteries can be N-type batteries or AA or AAA batteries. It is understood that any type of power source, preferably portable and small in size can be utilized. The battery type power source can be disposable or rechargeable.

In one configuration, the base 20 includes a battery compartment sized to operably retain the batteries when subject to the recoil that can be experienced in a high caliber firearm. The battery compartment can be formed of a weather resistant, resilient material such as plastic and shaped to include receptacles for receiving the battery(ies) required for power. Further, the battery compartment be selectively closeable or sealable to prevent environmental migration into the compartment.

Alternatively, the firearm 12 can incorporate the power source 50, including any associated batteries. In this configuration, the base 20 includes a pair of electrical contacts or pads for providing electrical communication between the head up display 10 and the firearm 12.

The light valve 60 is connected to the base 20 and disposed optically intermediate the laser 40 and the diffractive optic 30. The light valve 60 is selected such that upon illumination by the laser 40, the image of the light valve is formed onto the diffractive optic (or intermediate optics or subsequent projection onto the diffractive optic). The light valve 60 can be any of a variety of devices including liquid crystal displays or cathode ray tubes. In one configuration, the light valve 60 is a transmissive element, such as a liquid crystal display (LCD). It is understood the light valve can be a predetermined pattern or image for illumination by the passing laser beam.

The image generator 70 is operably connected to the light valve 60 to cause an image to be formed in the light valve for projection onto the diffractive optic 30. The image generator 30 can be any of a variety of mechanisms such as an integrated circuit or a computer chip. The image generator 70 can include a plurality of stored images that can be selected by the user in response to changing needs of the user. For example different reticle images can be stored in the image generator 70. In one configuration, the image generator 70 includes a user interface for controlling the image generator and selecting the image to be formed in the light valve 60. The image generator 70 can be powered by the power source 50. An image generator 70 such as a reflective or transmissive LCD manufactured (or sold) by Kopin Corporation has been found satisfactory.

In a further configuration, it is contemplated the image generator 70 can include a video driver for providing moving images to the light valve 60. The image generator 70 can also include reticles and range finding information.

In a further configuration, the image generator 70 cooperatives with a night vision system 80 for protecting output from the night vision system to the light valve 60 and hence the diffractive optic 30. The output signal from the night vision system 80 can be directly connected to the light valve, or passed through the image generator. The night vision system can be active or passive. The night vision system can be coupled or connected to the firearm, thereby allowing the operator to sight without looking through cumbersome goggles, monoculars or binoculars. A satisfactory night vision system 80 is manufactured (or sold) by ITT.

In a further configuration, the head up display 10 can include a receiver or transceiver for receiving information from a remote source. Such information can include targeting information, as well as strategic information, thereby allowing silent coordinated operations. As the images in the head up display are dynamic, the communication with remote sources allows coordination between a plurality of head up displays.

Thus, in an alternative configuration, the night vision system 80 can be separate from the firearm 12 and head up display 10. This configuration data from the night vision system 80 is provided via telemetry to the head up display 10. The head up display 10 can include a receiver (or transceiver) selected to acquire the data from the remote night vision system.

Although the light valve 60 and the image generator 70 are described as separate elements, it is contemplated the elements can be incorporated or integrated into a single unitary structure, without departing from the present invention.

Figure 3:
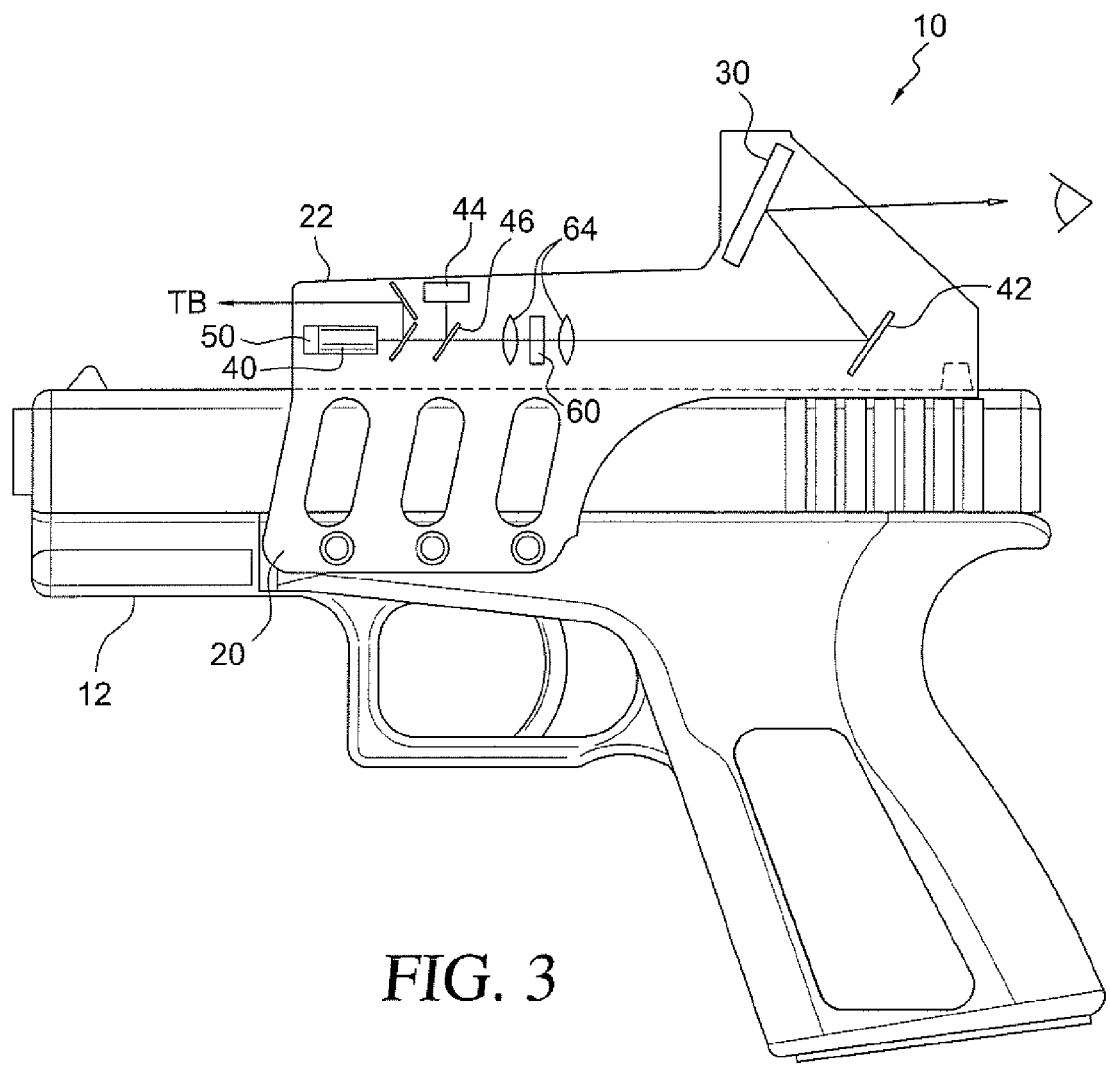
FIG. 3 is a side elevational view of a firearm incorporating an alternative design of the head up display.
Figure 4:
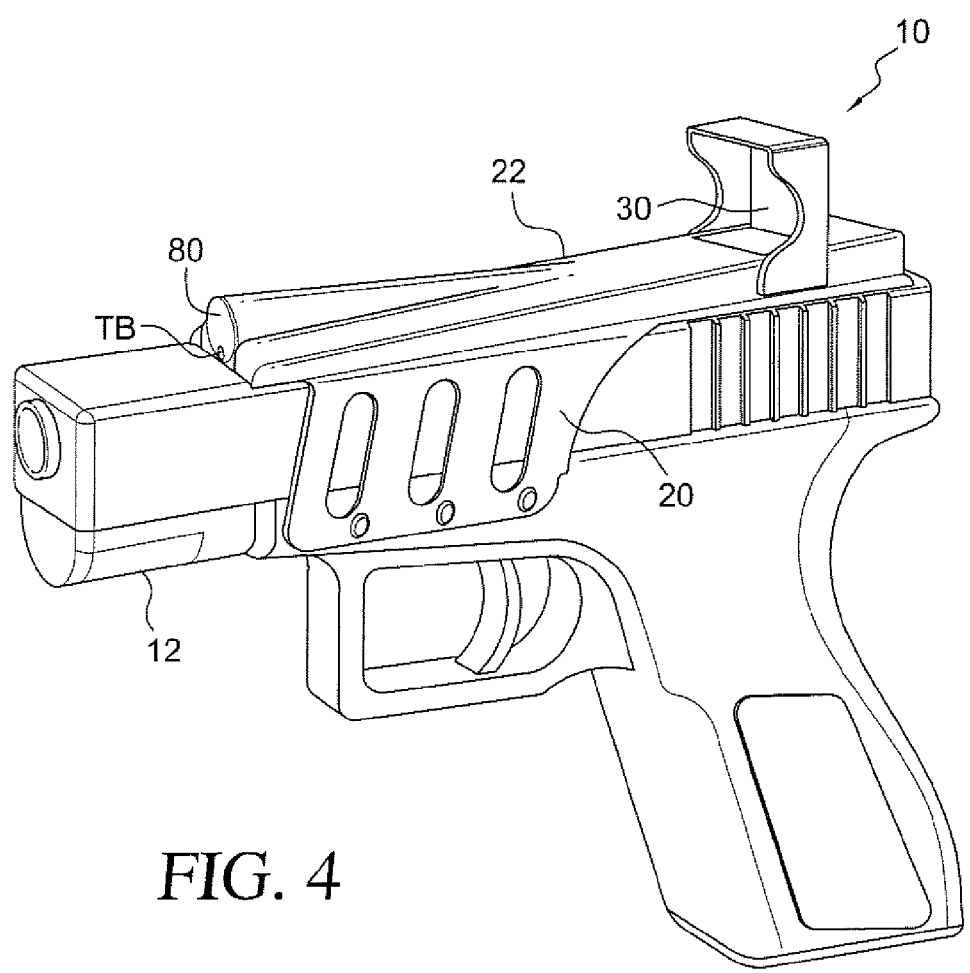
FIG. 4 is a perspective view of a firearm incorporating the head up display.

As seen in FIG. 3, it is understood that a collimating relay 64 can be disposed in cooperation with the light valve 60, such that the diverging illuminating laser beam passes through a collimating lens to form a collimated beam. The collimated beam then illuminates the light valve 60 and passes through a focusing lens which focuses the collimated beam onto the diffractive optic 30.

Referring to FIG. 3, in a further configuration, thermal stabilization of the laser 40 can be accomplished by employing a diffractive grating 44 off axis to the diverging beam via a beam splitter 46 such that a selected wavelength is introduced into the lasing medium of the laser, thereby controlling the output wavelength of the laser.

It is further contemplated that alignment of the light valve 60 with respect to the diffractive optic 30 can be accomplished by optically or physically moving the laser relative to one of the diffractive optic and/or the light valve.

In a further configuration, the laser beam can be split between an illuminating beam and a targeting beam TB. That is, the targeting beam is reflected from the firearm to intersect the target, while the illuminating beam passes through the light valve and onto the diffractive optic.

It is also contemplated that a range finder can be incorporated into the head up display 10. Commercially available range finders can be integrated into the housing, such that the output of the range finder is input into the image generator or light valve. Thus, the head up display can also provide range information to the user.

Operation

In operation, the image generator 70 cooperates with the light valve 60 to form an image in the light valve. The laser 40 is powered by the power source 50 to create a diverging illuminating coherent beam, wherein at least a portion of the illuminating beam passes through the light valve 60 such that a resulting image is projected onto the diffractive optic 30. The illuminating laser beam reconstructs the recorded image of the hologram and thus displays the image of the light valve 60 at infinity, such that the viewer looking through the diffractive optic sees the display of the light valve.

In the configuration of the head up display employing the video driver, moving images or varying images can be generated in the light valve 60 and thus "displayed" at the focal plane recreated by the hologram. Thus, range finding information can be readily displayed without requiring the user to move their head.

Although the present invention has been described in terms of particular embodiments, it is not limited to these embodiments. Alternative embodiments, configurations or modifications which will be encompassed by the invention can be made by those skilled in the embodiments, configurations, modifications or equivalents may be included in the spirit and scope of the invention, as defined by the appended claims.

The invention claimed is:

1. A method of sighting a firearm, comprising:
    (a) illuminating with a coherent illuminating beam a diffractive optic mounted to the firearm, the illuminating beam including data-comprising a dynamic image originating at a light valve optically upstream of the diffractive optic, wherein the diffractive optic is a hologram having a recorded image of an infinitely spaced focal plane.

2. The method of claim 1, further comprising moveably mounting the diffractive optic to the firearm.

3. The method of claim 1, further comprising fixedly connecting the diffractive optic to the firearm.

4. The method of claim 1, further comprising employing a reflective diffractive optic as the diffractive optic.

5. The method of claim 1, further comprising tilting the diffractive optic relative to the illuminating beam.

6. The method of claim 1, further comprising employing a liquid crystal display as the light valve.

7. The method of claim 1, wherein illuminating the diffractive optic creates a reconstructed image at a plane located from adjacent the firearm to infinity at infinity.

8. The method of claim 1, further comprising employing a laser to form the illuminating beam.

9. The method of claim 1, further comprising connecting an image generator to the light valve.

10. The method of claim 9, further comprising connecting a range finder to one of the image generator and the light valve.

11. The method of claim 1, further comprising forming a targeting beam of coherent light from the coherent illuminating beam and projecting the target beam toward a target.

12. The method of claim 1, further comprising employing one of a diffractive optic, a diverging diffractive optic and a collimating diffractive optic as the diffractive optic.

13. The method of claim 1, wherein the dynamic image comprises a video.

14. The method of claim 1, wherein the dynamic image is one of a plurality of different stored images.

15. The method of claim 1, further including displaying the dynamic image to a user of the firearm in response to selection by the user.

16. The method of claim 1, further including receiving an input from a remote source and displaying an additional image to a user in response to the input.

17. The method of claim 1, further including displaying the dynamic image to a user in addition to a static image generated by the diffractive optic.

18. The method of claim 1, wherein the diffractive optic is mounted at a sharper angle relative to a horizontal plane than the light valve.

19. The method of claim 1, further including directing electrical power to the diffractive optic.

20. The method of claim 1, further including adjusting a mount connected to the diffractive optic to adjust the diffractive optic around three axes.

21. The method of claim 20, wherein the three axes comprise mutual perpendicular axes.

22. A method of sighting a firearm, comprising:
    passing a coherent illuminating beam through a light valve mounted to the firearm optically upstream of a diffractive optic;
    illuminating the diffractive optic with the illuminating beam; and
    displaying one of a plurality of different stored images to a user of the firearm with the illuminated diffractive optic in response to an image selection made by the user, wherein the one of a plurality of different stored images is an image plane at infinity.

23. The method of claim 22, wherein the image is generated by the light valve.

24. The method of claim 23, further including receiving information from a remote source and displaying a portion of the information to the user.

25. A method of sighting a firearm, comprising:
    passing a coherent illuminating beam through a light valve mounted to the firearm optically upstream of a hologram, the light valve generating a dynamic image;
    directing the coherent illuminating beam at the hologram, the hologram forming a static image; and
    displaying the dynamic and static images to the user at the same time, wherein the dynamic image is displayed at an infinite image plane.

26. The method of claim 25, wherein the static image comprises a recorded infinite image plane.

27. The method of claim 25, wherein the dynamic image is one of a plurality of stored images.

28. The method of claim 25, wherein the dynamic image is displayed in response to selection by the user.

29. The method of claim 25, wherein a video driver assists in generating the dynamic image.

\* \* \* \* \*